(12) United States Patent
Percival

(10) Patent No.: US 7,610,685 B2
(45) Date of Patent: Nov. 3, 2009

(54) APPARATUS FOR IDENTIFICATION AND SIMULATION OF VEHICLE WHEEL AND TIRE DIMENSIONS

(76) Inventor: Jeffrey D. Percival, 369 Rountable Dr., Camdenton, MO (US) 65020

( * ) Notice: Subject to any disclaimer, the term of this patent is extended or adjusted under 35 U.S.C. 154(b) by 12 days.

(21) Appl. No.: 11/937,974

(22) Filed: Nov. 9, 2007

(65) Prior Publication Data
US 2008/0110035 A1 May 15, 2008

Related U.S. Application Data

(60) Provisional application No. 60/857,898, filed on Nov. 10, 2006.

(51) Int. Cl.
*G01B 5/14* (2006.01)
(52) U.S. Cl. ..................... 33/203.18; 33/203

(58) Field of Classification Search ................... 33/203, 33/203.18, 203.19, 203.2, 203.21, 555.4
See application file for complete search history.

(56) References Cited

U.S. PATENT DOCUMENTS

| | | | | |
|---|---|---|---|---|
| 5,174,032 | A * | 12/1992 | Beck | 33/203 |
| 5,398,419 | A * | 3/1995 | Schmidt et al. | 33/203 |
| 6,035,729 | A * | 3/2000 | Weinmann | 33/203 |
| 7,073,267 | B2 * | 7/2006 | Butler et al. | 33/203 |
| 7,353,610 | B2 * | 4/2008 | Gerdes et al. | 33/203 |
| 2006/0096109 | A1 * | 5/2006 | Corghi | 33/203.18 |

\* cited by examiner

*Primary Examiner*—G. Bradley Bennett
(74) *Attorney, Agent, or Firm*—Thompson Coburn LLP

(57) ABSTRACT

An apparatus that identifies and simulates vehicle wheel and tire dimensions can be removably attached to a vehicle wheel hub and adjusted in radial and axial directions to determine the dimension of a wheel and tire that would fit the vehicle.

22 Claims, 4 Drawing Sheets

APPARATUS FOR IDENTIFICATION AND SIMULATION OF VEHICLE WHEEL AND TIRE DIMENSIONS

This patent application claims the benefit of the provisional patent application No. 60/857,898, filed on Nov. 10, 2006.

BACKGROUND OF THE INVENTION (1) Field of the Invention

This present invention pertains to an apparatus that can be removably attached to a wheel hub of a vehicle and adjusted to determine the dimensions of a wheel and tire that would fit the vehicle.

(2) Describing the Prior Art

In customizing and personalizing wheeled vehicles such as automobiles, it is often desirable to replace the original wheels and tires of the vehicle with other preferred wheels and tires. However, due to the existing construction of the vehicle, it is often a difficult task to find a desired wheel and tire that can be matched to the particular vehicle.

In finding a desirable wheel and tire that can be installed on a vehicle and function properly and safely on the vehicle, the choices are limited by the existing construction of the vehicle. For example, the wheel hubs of the vehicle will have an existing pattern of lug holes or lug bolts. Any replacement wheel must have the same pattern of lug holes in the wheel. In addition, the dimensions of the vehicle wheel wells, or the positions of the vehicle fenders also place limits on the dimensions of the wheel and tire that can be fit to the vehicle. It is often necessary for the individual customizing and personalizing a vehicle to install several different wheel and tire combinations on the vehicle to assess the practicality of using a particular wheel and tire combination. This conventional process of installing several desired wheel and tire combinations on a vehicle to assess their practicality is very time consuming, can be very expensive, and often is inaccurate. Because of these and other problems that occur when attempting to match desired wheels and tires to a vehicle when customizing and personalizing the vehicle, there is a need for a easier, more time efficient, more inexpensive and more accurate method of matching a desired wheel and tire to a particular vehicle.

SUMMARY OF THE INVENTION

The present invention overcomes the above described problems associated with customizing and personalizing a vehicle by replacing the original wheels and tires of the vehicle with desired wheels and tires. This is accomplished by the apparatus of the invention that is adjusted to simulate the characteristics of a vehicle wheel and tire, for example the dimensions of a wheel and tire that can be fit to a particular vehicle. The apparatus of the invention is basically a five-part tool, where each of the five parts are connected for adjustable movements relative to each other to determine and simulate the lug hole pattern of a wheel and the axial and radial dimensions of a wheel and tire that could be fit to an existing vehicle.

The first part of the apparatus of the invention is a wheel hub member. The wheel hub member has a plurality of lug holes through the member. The plurality of lug holes include different sets of holes that are arranged in different patterns that match the possible arrangements of lug bolts and lug bolt holes on the wheel hub of a vehicle. Positioning the wheel hub member against the vehicle wheel hub and matching the lug bolts or lug holes of the vehicle wheel hub to a set of lug holes in the wheel hub member determines the required pattern of lug holes for a replacement wheel.

The second part of the apparatus of the invention is a wheel diameter member. The wheel diameter member is mounted to the wheel hub member for movement of the wheel diameter member in radially opposite directions relative to the wheel hub member. With the wheel hub member positioned against the wheel hub of a vehicle, the wheel diameter member can be adjustably radially positioned relative to the wheel hub member to an adjusted position that simulates the maximum diameter dimension of a wheel and tire that can be fit to the vehicle.

A first adjustable fastener is provided between the wheel diameter member and the wheel hub member. This first adjustable fastener is selectively operable to secure the wheel diameter member in its adjusted position relative to the wheel hub member.

The third part of the apparatus of the invention is a wheel width member. The wheel width member is mounted on the wheel diameter member for adjustable movement of the wheel width member in axially opposite directions relative to the wheel diameter member. With the wheel hub member positioned against the wheel hub of the vehicle, the wheel width member can be adjustably positioned in axially opposite directions to an adjusted position of the wheel width member relative to the wheel diameter member. The adjusted position of the wheel width member simulates the maximum width dimension of a wheel and tire in an axially outboard direction from the vehicle wheel hub that could be used on the vehicle.

A second adjustable fastener is provided between the wheel width member and the wheel diameter member. The second adjustable fastener can be selectively operated to secure the wheel width member in its adjusted position relative to the wheel diameter member.

The fourth part of the apparatus of the invention is a wheel backspacing member. The wheel backspacing member is mounted on the wheel width member for adjustable movement in opposite axially directions relative to the wheel width member and the wheel diameter member. The wheel backspacing member can be moved axially to an adjusted position that simulates the maximum axial dimension in the inboard direction relative to the vehicle wheel hub of a wheel that could be fit to the vehicle.

The second adjustable fastener is also selectively operable to the secure the wheel backspacing member in the adjusted position relative to the wheel width member and the wheel diameter member.

The fifth part of the apparatus of the invention is a tire profile member. The tire profile member is basically a length of copper wire with a rubber coating or a coating of a similar resilient material. The length of the tire profile member is bent to simulate the cross-section profile of a tire. The opposite ends of the tire profile member are bent toward each other and positioned over the wheel width member and the wheel backspacing member. The resilience of the wire holds the tire profile member in place on the apparatus of the invention, with the bent configuration of the tire profile member projecting outwardly from the wheel width member and the wheel backspacing member and simulating the cross-section profile of a tire.

With the five parts of the apparatus of the invention secured in their adjusted positions that are determined from the wheel hub and the surrounding dimensions of the vehicle for which a replacement wheel and tire are desired, the apparatus can then be used to compare with different wheel and tire combinations to determine which combinations could be fit to the vehicle wheel hub and used safely on the vehicle.

Thus, the apparatus of the invention is capable of simulating any wheel and tire profile. Attaching the adjusted apparatus to the wheel hub and turning the wheel hub with the apparatus on the wheel hub shows the clearances that a wheel and tire combination would actually yield if installed. The apparatus of the invention is easily operated by hand, with no other tools or devices required.

BRIEF DESCRIPTION OF THE DRAWINGS

Further features of the invention are set forth in the following detailed description of the preferred embodiment of the invention, and in the drawing figures.

DETAILED DESCRIPTION OF THE PREFERRED EMBODIMENT OF THE INVENTION

Figure 1:
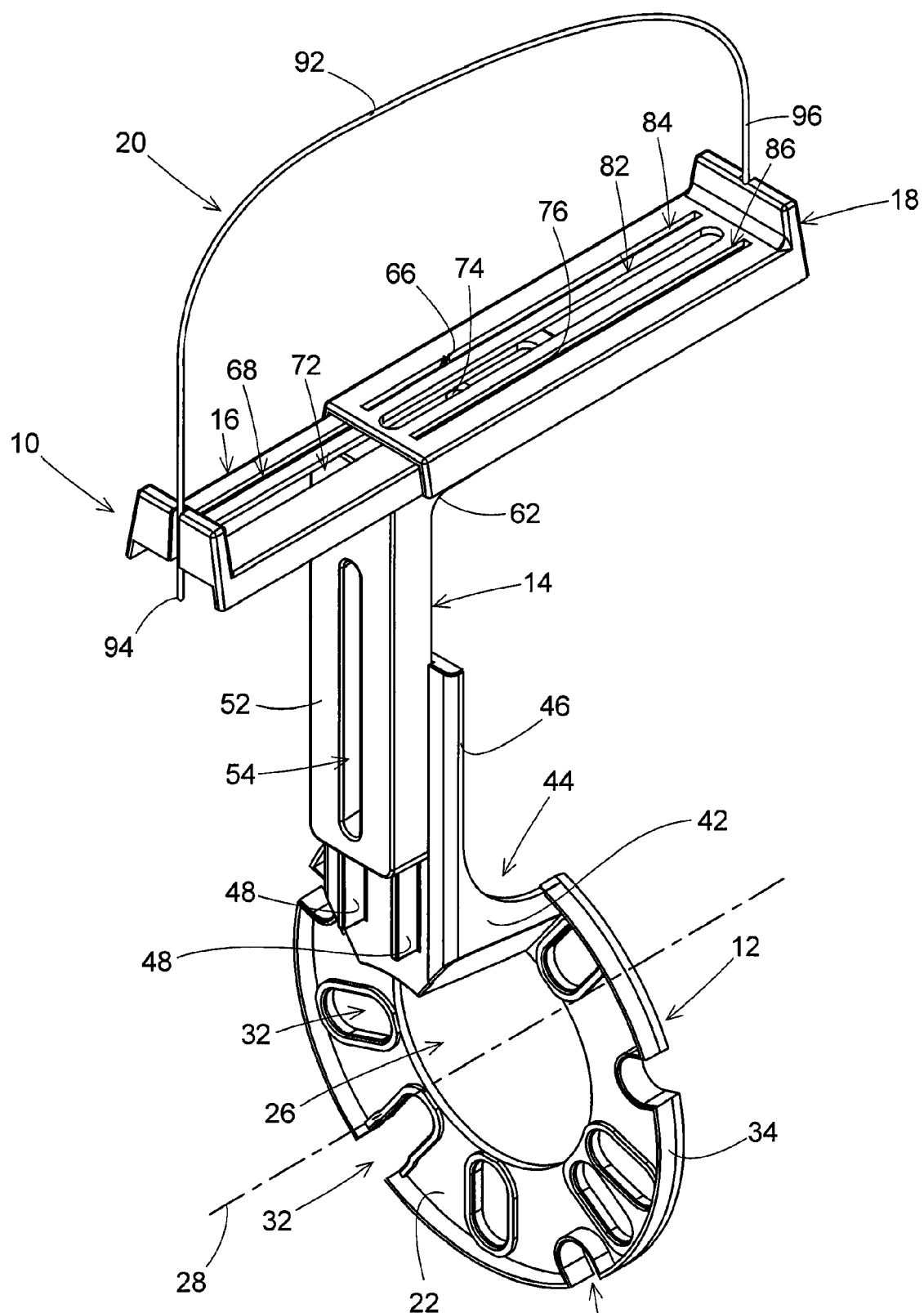
FIG. 1 is a perspective view of the apparatus of the invention.

As stated earlier, the apparatus of the invention is comprised of five basic parts. Four of these parts is preferably constructed of a plastic material. However, other similar materials, for example stamped sheet metal may be employed. The five basic parts of the apparatus include the wheel hub member (12), the wheel diameter member (14), the wheel width member (16), the wheel backspacing member (18), and the tire profile member (20).

Figure 3:
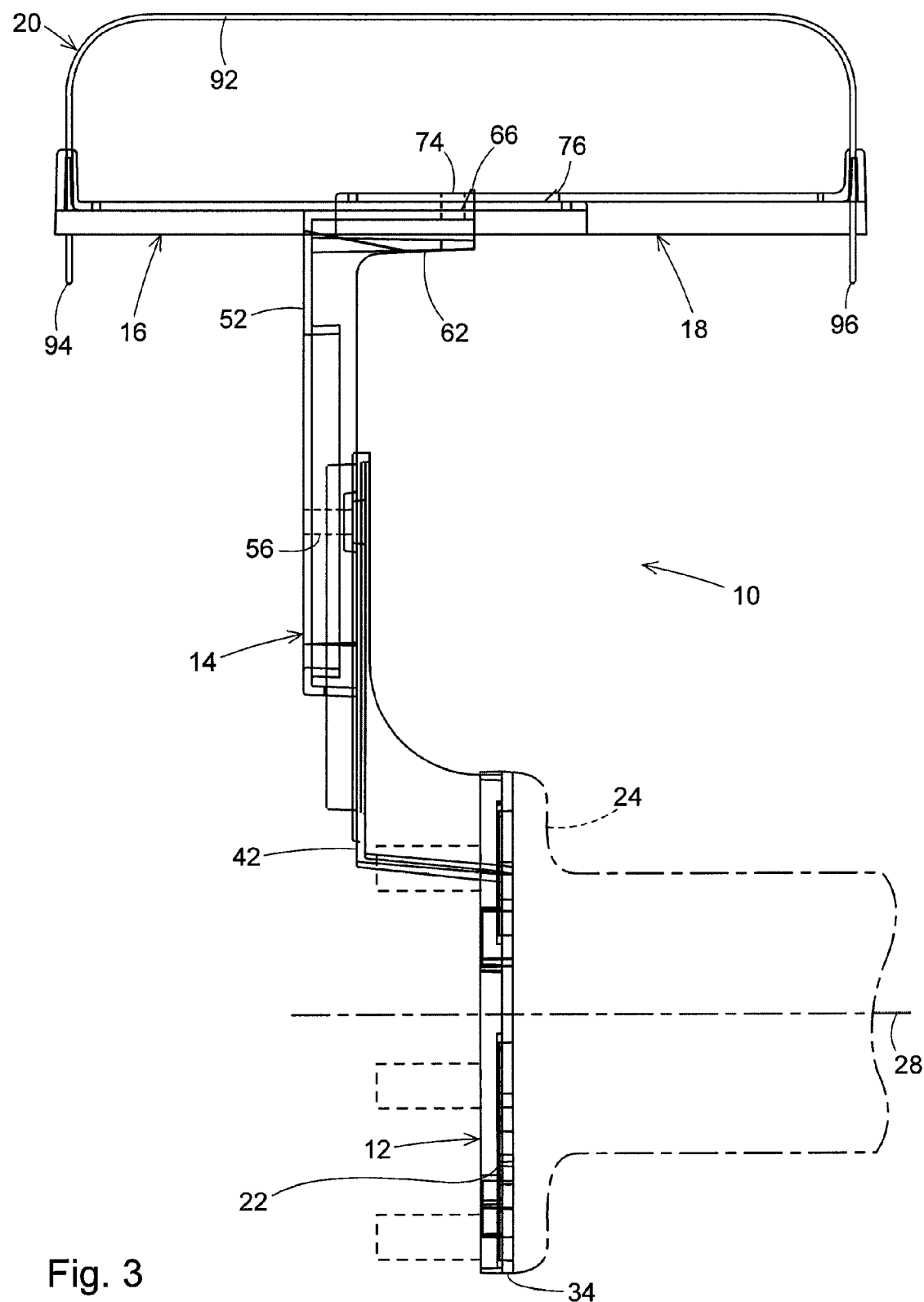
FIG. 3 is an end elevation view of the apparatus.

The wheel hub member (12) has a flat circular plate (22) that is dimensioned to be positioned against a vehicle wheel hub in use of the apparatus. A wheel hub (24) is shown in dashed lines in FIG. 3 with the plate (22) positioned against the hub (24). The plate (22) has a circular center opening (26) having a center axis (28). The center axis (28) is coaxially aligned with the center axis of the wheel hub (24) when the apparatus is installed on the wheel hub. The axis (28) also defines mutually perpendicular axial and radial directions referred to in the following description. A plurality of lug openings (32) pass through the plate (22). As shown in FIG. 3, some of the lug openings (32) are positioned in the plate (22) entirely between the center opening (26) and an outer peripheral edge (34) of the plate. This first set of lug openings have basically the same radial spacing dimension from the center axis (28). Other openings of a plurality of lug openings (32) intersect the peripheral edge (34) of the plate (22). This second set of lug openings have the same radial spacing dimension from the center axis (28). The radial spacing dimension of the second set is longer than that of the first set. Several of the plurality of lug openings (32) have equal circumferential spacing arrangements around the center axis (28) of the plate opening (26). For example, one of these sets of lug openings (32) includes the four lug openings (36) that are each equally radially spaced from the center axis (28) and are each equally circumferentially spaced 900 around the center axis (28). An additional set of five lug holes (38) are each equally radially spaced from the center axis (28) and are each equally circumferentially spaced 720 around the center axis (28). These two sets of lug holes (36), (38) exemplify how the particular patterns of the plurality of lug holes (32) in the plate (22) adapt the wheel hub member (12) to be removably attached to a variety of different wheel hubs having a variety of different lug bolt patterns and lug bolt hole patterns.

In addition to the lug openings (32), a support arm (42) projects outwardly from the plate (22). The support arm (42) extends axially outwardly from the plate (22) and has a portion that extends radially from the plate (22) over an arcuate opening (44) in the plate. A pair of rails (48) extend radially across one side of the support arm radial extension (46). The arcuate opening (44) and the axial extension of the support arm (42) from the plate (22) are provided to allow a lug bolt of a vehicle wheel hub to be positioned in the arcuate opening (44) when attaching the wheel hub member (12) to a wheel hub.

Figure 2:
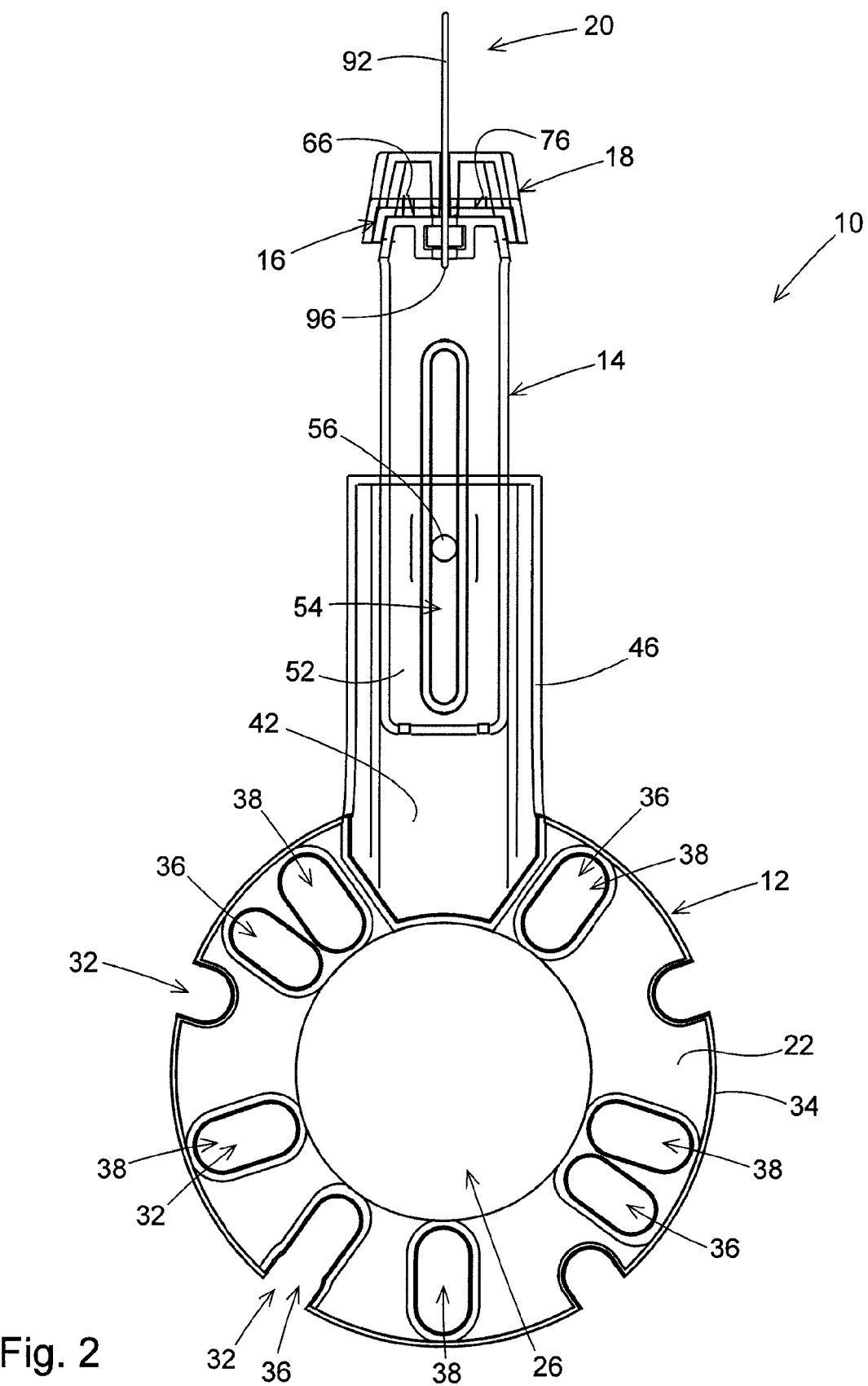
FIG. 2 is a side elevation view of the apparatus of the invention positioned adjacent a vehicle wheel hub with the wheel hub being shown in dashed lines.
Figure 4:
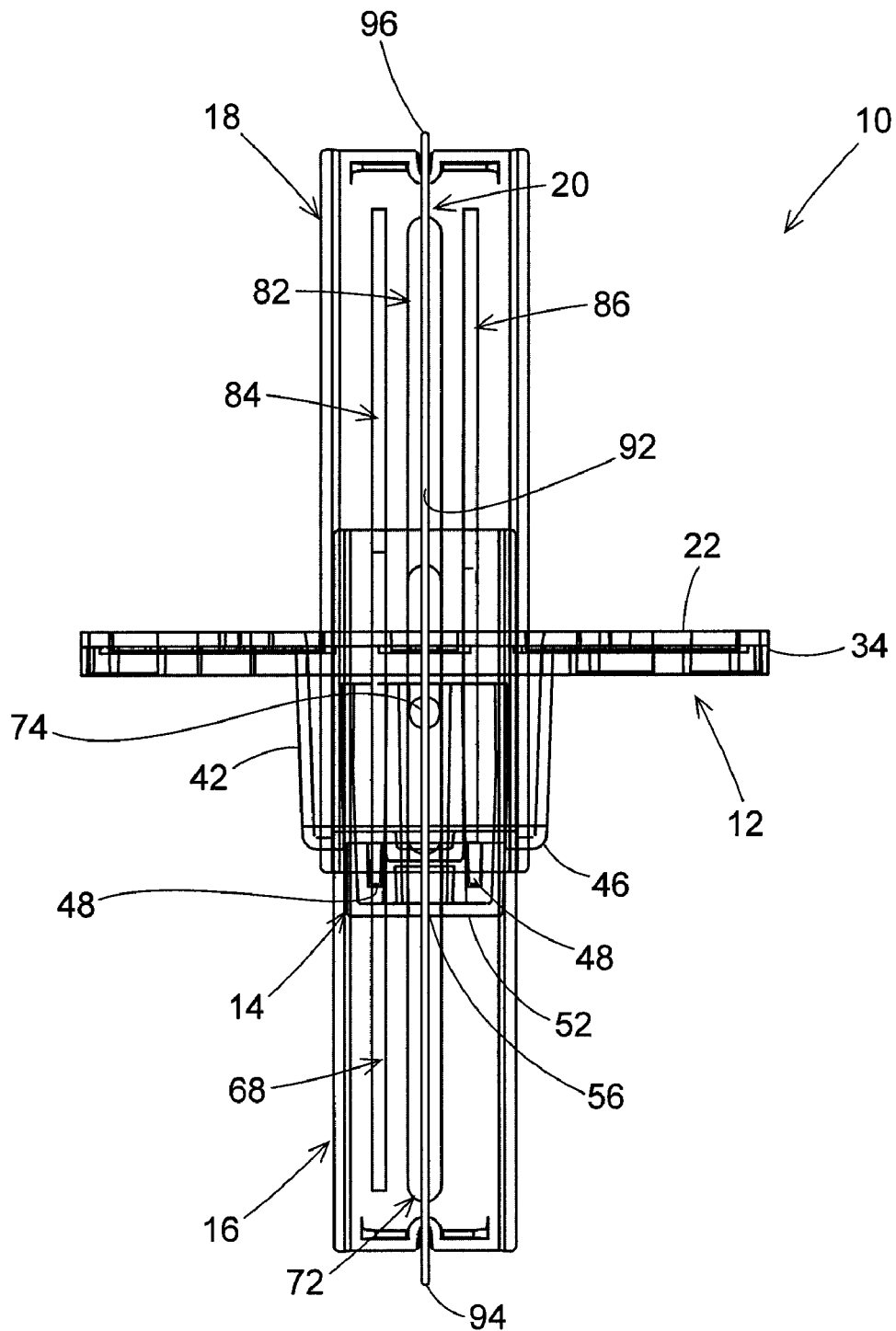
FIG. 4 is a top plan view of the apparatus.

The wheel diameter member (14) is mounted on the radial arm extension (46) of the wheel hub member (12) for adjustable movement in radially opposite directions. A radial length (52) of the wheel diameter member (14) has a U-shaped cross section configuration. The U-shaped configuration is dimensioned to fit and slide over the pair of rails (48) on the radial arm extension (46) of the wheel hub member (12). The rails (48) guide the radial movement of the wheel diameter member (14) on the wheel hub member (12). An elongate slot (54) is provided through the radial length (52) of the wheel diameter member (12). A first adjustable fastener (56) (represented schematically in FIGS. 2-4), for example a screw or a bolt and nut fastener extends through the elongate slot (54) and connects the wheel diameter member (14) to the wheel hub member (12). The fastener (56) is operable to secure the wheel diameter member (14) to the wheel hub member (12) in a desired adjusted position. Other types of adjustable fasteners that function in an equivalent manner to a screw or threaded bolt and nut could be employed as the first adjustable fastener (56). Wheel diameter dimensions (not shown) are printed along the opposite sides of the slot (54). The dimension adjacent the fastener (56) when the wheel diameter member (12) is in an adjusted position is the diameter dimension of a wheel simulated by the apparatus. The distal end of the wheel diameter member radial length (52) has an angled platform portion (62) that is oriented at a right angle to the radial length (52). The platform portion (62) has a sliding surface (64) that is positioned in a plane that is parallel to the center axis (28) of the wheel hub member opening (26). A first guide pin (66) projects from the sliding surfaces (64).

The wheel width member (16) is mounted for sliding adjustable movement on the platform portion (62) of the wheel diameter member (14). The wheel width member (16) has a length with a U-shaped cross section that fits over the platform portion (62) of the wheel diameter member (14). This constrains the wheel width member (16) for movement in axially opposite directions relative to the wheel diameter member (14) and the wheel hub member (12). A narrow slot (68) extends through the length of the wheel width member (16). The first guide pin (66) engages in the narrow slot (68) and further constrains the movement of the wheel width member (16) to axially opposite directions relative to the wheel diameter member (14) and the wheel hub member (12). A wider slot (72) is provided through the length of the wheel width member (16) adjacent to the narrow slot (68). A second adjustable fastener (74) (represented schematically in FIGS. 2-4) extends through the wider slot (72) and connects the wheel width member (16) to the wheel diameter member (14). The second adjustable fastener (74) is selectively operable to secure the wheel width member (16) to the wheel diameter member and to the wheel hub member (12) in an axially adjusted position of the wheel width member (16) relative to the wheel diameter member (14) and the wheel hub member (12). The second adjustable fastener (74), like the first adjustable fastener (56) could be a screw or a threaded bolt and nut combination. Other equivalent types of fasteners could also be used. A wheel width scale (not shown) is printed along one side of the slot (68). The dimension adjacent the first guide pin (66) when the wheel width member (16) is in an adjusted position is the width dimension of a wheel simulated by the apparatus. A second guide pin (76) projects outwardly from the wheel width member (16) on an opposite side of the wider slot (72) from the narrow slot (68).

The wheel backspacing member (18) also has an elongate length with a U-shaped cross section. The U-shaped cross section of the wheel backspacing member (18) is dimensioned to fit in sliding engagement over the wheel width member (16). The length of the wheel backspacing member (18) has a center wide slot (82), and a pair of narrow slots (84) that extend along opposite sides of the wide slot (82). The first guide pins (66) projecting from the platform portion (62) of the wheel diameter member (14) extends through the narrow slot (68) of the wheel width member (16) and into one of the narrow slots (84) of the wheel backspacing member (18). The second guide pin (76) projects from the wheel width member (16) and into the other narrow slot (86) of the wheel backspacing member (18). The engagement of the pins in the narrow slots constrains the movement of the wheel backspacing member (18) to movement in axially opposite directions relative to the wheel width member (16), the wheel diameter member (14), and the wheel hub member (12). In addition, the second adjustable fastener (74) also extends through the wide slot (82) of the wheel backspacing member (18). This also constrains the movement of the wheel backspacing member (18) to movement in axially opposite directions. Furthermore, the second adjustable fastener (74) is selectively operable to secure the wheel backspacing member (18) to the wheel width member (16) and the wheel diameter member (14) to hold the wheel backspacing member (18) in an adjusted position relative to the wheel width member (16), the wheel diameter member (14) and the wheel hub member (12). A backspace scale (not shown) is printed along the opposite side of the wheel width member slot (68) from the wheel width scale. The dimension adjacent the second guide pin (76) when the wheel backspacing member is in an adjusted position is the backspace dimension of a wheel simulated by the apparatus.

The tire profile member (20) is basically a coated length of copper wire (92). The wire is coated with a rubber material or other similar type of resilient material. The length of wire 92 is bent in a general U-shaped configuration that simulates the cross-section of a tire. The opposite ends (94), (96) of the wire are bent toward each other and are positioned in slots provided in the ends of the wheel width member (16) and the wheel backspacing member (18). The resilience of the wire (92) holds the tire profile member (20) in place, with the bent configuration of the wire (92) projecting outwardly from the wheel width member (16) and the wheel backspacing member (18). With the wire 92 so attached to the apparatus, it simulates the cross-section profile of a tire mounted on a wheel.

In use of the apparatus of the invention, the wheel hub member (12) is positioned with the plate (22) against the wheel hub (24) of a vehicle desired to be fit with a wheel and tire. The positioning of the wheel hub member plate (22) against the vehicle wheel hub (24) determines the required pattern of lug openings (32) needed on the wheel to attach the wheel to the wheel hub (24). With the wheel hub member (12) in place, the wheel diameter member (14) is then adjustably positioned in opposite radial directions to determine the maximum diameter dimension of the wheel and tire that can be fit to the vehicle hub. Selective operation of the first adjustable fastener (56) then secures the wheel diameter member (14) in its adjusted position. The wheel width member (16) and the wheel backspacing member (18) can then be adjustably positioned on the wheel diameter member (14) to determine the width or axial dimensions of the wheel and tire that can be fit on the vehicle. Selective operation of the second adjustable fastener (74) then secures the wheel width member (16) and the wheel backspacing member (18) in their adjusted positions on the wheel diameter member (14). The wire (92) of the tire profile member (20) is then bent to a desired configuration that simulates the cross-section of a tire and is attached over the wheel width member (16) and the wheel backspacing member (18). The entire apparatus can then be turned relative to the vehicle by turning the vehicle wheel hub (24) to ensure that a wheel and tire having axial and radial dimensions that correspond to the adjusted positions of the apparatus will have sufficient clearance on the vehicle. In this manner, the apparatus of the invention easily and efficiently simulates the characteristics of a vehicle wheel and tire.

Although the apparatus of the invention has been described above by referring to a specific embodiment, modifications and variations could be made to the apparatus without departing from the intended scope of the following claims.

What is claimed is:

1. An apparatus that simulates characteristics of a vehicle wheel and tire, the apparatus comprising:
   a wheel hub member that is removably attachable to a vehicle wheel hub with the vehicle wheel hub having an axis of rotation that defines mutually perpendicular axial and radial directions relative to the wheel hub member when the wheel hub member is attached to the vehicle wheel hub;
   a wheel width member and a wheel backspacing member that are both operatively connected to the wheel hub member for movement together in radially opposite directions relative to the wheel hub member, the wheel width member and the wheel backspacing member both being movable radially to an adjusted position of the wheel width member and the wheel backspacing member relative to the wheel hub member that corresponds to a radial dimension of a wheel and tire that is mountable on the vehicle wheel hub, and the wheel width member and the wheel backspacing member being connected together for movement in axially opposite directions to an adjusted position of the wheel width member and wheel backspacing member that corresponds to an axial dimension of a wheel and tire that is mountable on the vehicle wheel hub;
   a wheel diameter member mounted on the wheel hub member for movement in radially opposite directions relative to the wheel hub member;
   the wheel width member and the wheel backspacing member both being mounted on the wheel diameter member and thereby the wheel width member and the wheel backspacing member being operatively connected to the wheel hub member; and,
   a tire profile member having a narrow, bendable and resilient length with opposite first and second ends, the length being bent in a general U-shape and the opposite first and second ends being attached over the wheel width member and the wheel backspacing member.

2. The apparatus of claim 1, further comprising:
   the wheel hub member having a plurality of lug openings through the wheel hub member at positions that correspond to positions of vehicle wheel hub lug bolts.

3. The apparatus of claim 1, further comprising:
   the wheel hub members having a plurality of lug openings through the wheel hub member, and four of the lug openings being equally radially spaced from the vehicle wheel hub axis of rotation and being equally circumferentially spaced around the vehicle wheel hub axis of rotation when the wheel hub member is attached to the vehicle wheel hub.

4. The apparatus of claim 3, further comprising:

five of the lug openings being equally radially spaced from the vehicle wheel hub axis of rotation and being equally circumferentially spaced around the vehicle wheel hub axis of rotation when the wheel hub member is attached to the vehicle wheel hub.

5. The apparatus of claim 1, further comprising:

the wheel hub members having a plurality of lug openings through the wheel hub member, and five of the lug openings being equally radially spaced from the vehicle wheel hub axis of rotation and being equally circumferentially spaced around the vehicle wheel hub axis of rotation when the wheel hub member is attached to the vehicle wheel hub.

6. The apparatus of claim 1, further comprising:

the wheel width member being mounted on the wheel diameter member for movement in axially opposite directions relative to the wheel diameter member; and, the wheel backspacing member being mounted on the wheel width member for movement in axially opposite directions relative to the wheel width member and the wheel diameter member.

7. The apparatus of claim 6, further comprising:

a first adjustable fastener between the wheel diameter member and the wheel hub member that is operable to secure the wheel diameter member to the wheel hub member and prevent further movement of the wheel diameter member in radially opposite directions relative to the wheel hub member.

8. The apparatus of claim 7, further comprising:

a second adjustable fastener between the wheel width member, the wheel backspacing member and the wheel diameter member that is operable to secure the wheel width member and the wheel backspacing member to the wheel diameter member and prevent further movement of the wheel width member and wheel backspacing member in axially opposite directions relative to the wheel diameter member.

9. The apparatus of claim 1, further comprising:

the wheel diameter member being spaced axially from the wheel hub member and providing clearance for a lug bolt to extend through the wheel hub member at a position in radial alignment with the wheel diameter member.

10. An apparatus that simulates characteristics of a vehicle wheel and tire, the apparatus comprising:

a wheel hub member that is removably attachable to a vehicle wheel hub with the vehicle wheel hub having an axis of rotation that defines mutually perpendicular axial and radial directions relative to the wheel hub member when the wheel hub member is attached to the vehicle wheel hub;

a wheel diameter member mounted on the wheel hub member for adjustable movement of the wheel diameter member in opposite radial directions to an adjusted position of the wheel diameter member relative to the wheel hub member;

a wheel width member mounted on the wheel diameter member for adjustable movement of the wheel width member in opposite axial directions to an adjusted position of the wheel width member relative to the wheel diameter member;

a wheel backspacing member mounted on the wheel width member for adjustable movement of the wheel backspacing member in opposite axial directions relative to the wheel width member to an adjusted position of the wheel backspacing member relative to the wheel width member; and, a tire profile member having a narrow, bendable and resilient length with opposite first and second ends, the length being bent in a general U-shape and the opposite first and second ends being attached over the wheel width member and the wheel backspacing member.

11. The apparatus of claim 10, further comprising:

the wheel hub member having a plurality of lug openings through the wheel hub member at positions that correspond to positions of vehicle wheel hub lug bolts.

12. The apparatus of claim 10, further comprising:

the wheel hub member having a plurality of lug openings through the wheel hub member, and four of the lug openings being equally radially spaced from the vehicle wheel hub axis of rotation and being equally circumferentially spaced around the vehicle wheel hub axis of rotation when the wheel hub member is attached to the vehicle wheel hub.

13. The apparatus of claim 12, further comprising:

four of the lug openings being equally radially spaced from the vehicle wheel hub axis of rotation and being equally circumferentially spaced around the vehicle wheel hub axis of rotation when the wheel hub member is attached to the vehicle wheel hub.

14. The apparatus of claim 10, further comprising:

the wheel hub member having a plurality of lug openings through the wheel hub member, and five of the lug openings being equally radially spaced from the vehicle wheel hub axis of rotation and being equally circumferentially spaced around the vehicle wheel hub axis of rotation when the wheel hub member is attached to the vehicle wheel hub.

15. The apparatus of claim 10, further comprising:

a first adjustable fastener between the wheel diameter member and the wheel hub that is operable to secure the wheel diameter member in the adjusted position relative to the wheel hub member and prevent further movement of the wheel diameter member relative to the wheel hub member.

16. The apparatus of claim 15, further comprising:

a second adjustable fastener between the wheel width member and the wheel diameter member that is operable to secure the wheel width member in the adjusted position relative to the wheel diameter member and prevent further movement of the wheel width member relative to the wheel diameter member.

17. The apparatus of claim 10, further comprising:

a first adjustable fastener between the wheel diameter member and the wheel hub member that is operable to secure the wheel diameter member in the adjusted position relative to the wheel hub member and prevent further movement of the wheel diameter member relative to the wheel hub member; and, a second adjustable fastener between both the wheel width member and the wheel backspacing member and the wheel diameter member that is operable to secure both the wheel width member and the wheel backspacing member in adjusted positions relative to the wheel diameter member and prevent further movements of both the wheel width member and the wheel backspacing member relative to the wheel diameter member.

18. An apparatus that simulates characteristics of a vehicle wheel and tire, the apparatus comprising:
- a wheel hub member having a plate with a circular center opening with a center axis that defines mutually perpendicular axial and radial directions, the plate having a plurality of lug openings that are spacially arranged around the center opening;
- a wheel diameter member mounted on the wheel hub member for adjustable movement of the wheel diameter member in opposite radial directions to an adjusted position of the wheel diameter member relative to the wheel hub member;
- a wheel width member mounted on the wheel diameter member for adjustable movement of the wheel width member in opposite axial directions to an adjusted position of the wheel width member relative to the wheel diameter member;
- a wheel backspacing member mounted on the wheel width member for adjustable movement of the wheel backspacing member in opposite axial directions to an adjusted position of the wheel backspacing member relative to the wheel width member; and,
- a tire profile member having a narrow, bendable and resilient length with opposite first and second ends, the length being bent in a general U-shape and the opposite first and second ends being attached over the wheel width member and the wheel backspacing member.

19. The apparatus of claim 18, further comprising:
the plurality of lug openings including four lug openings that are equally radially spaced from the center axis of the wheel hub member center opening and are equally circumferentially spaced around the center axis of the wheel hub member center opening.

20. The apparatus of claim 19, further comprising:
the plurality of lug openings include five lug openings that are equally radially spaced from the center axis of the wheel hub member center opening and are equally circumferentially spaced around the center axis of the wheel hub member center opening.

21. The apparatus of claim 18, further comprising:
a first adjustable fastener between the wheel diameter member and the wheel hub member that is operable to secure the wheel diameter member to the wheel hub member and prevent further movement of the wheel diameter member in radially opposite directions relative to the wheel hub member.

22. The apparatus of claim 21, further comprising:
a second adjustable fastener between the wheel width member, the wheel backspacing member and the wheel diameter member that is operable to secure the wheel width member and the wheel backspacing member to the wheel diameter member and prevent further movement of the wheel width member and wheel backspacing member in axially opposite directions relative to the wheel diameter member.

* * * * *